(No Model.)

A. H. BRILL.
MILK COOLER.

No. 253,178. Patented Feb. 7, 1882.

Attests
Davin
L. J. Oates

Inventor
Augustus H. Brill
By his atty.

UNITED STATES PATENT OFFICE.

AUGUSTUS H. BRILL, OF OXFORD, NEW YORK.

MILK-COOLER.

SPECIFICATION forming part of Letters Patent No. 253,178, dated February 7, 1882.

Application filed August 26, 1881. (No model.)

*To all whom it may concern:*

Be it known that I, AUGUSTUS H. BRILL, of Oxford, in the county of Chenango and State of New York, have invented an Improvement in Milk-Coolers, of which the following is a specification.

My invention has reference to milk-coolers in general which are adapted to raise cream; and it consists in a tank in which is suspended a second tank or vat adapted to contain the milk, said milk-tank being provided with hollow ribs, said ribs extending partly across the tank, and being open to the water-tank on the bottom and one end, which latter opens into an ice-box arranged at one end of the water-tank and between the milk-tank and end of water-tank, and means to feed cold water against the closed end of the ribs and cause it to circulate around the bottom and sides of the milk-tank, through the ice-box, and back again to the supply-pipe, and in minor details of construction, all of which are fully set forth in the following specification and shown in the accompanying drawings, which form part thereof.

The object of this invention is to so construct a milk-cooler that the milk-tank is made removable from the water-tank in which it is adapted to set, and to provide an ice-box in close contact with the milk-tank, and provide means to feed the cooling-water in such a manner that a perfect circulation will be the result.

Figure 1:
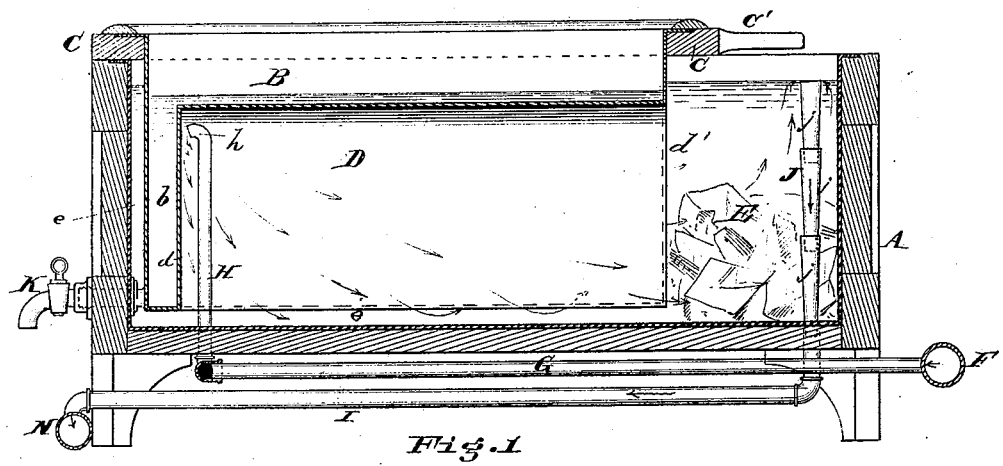
Figure 2:
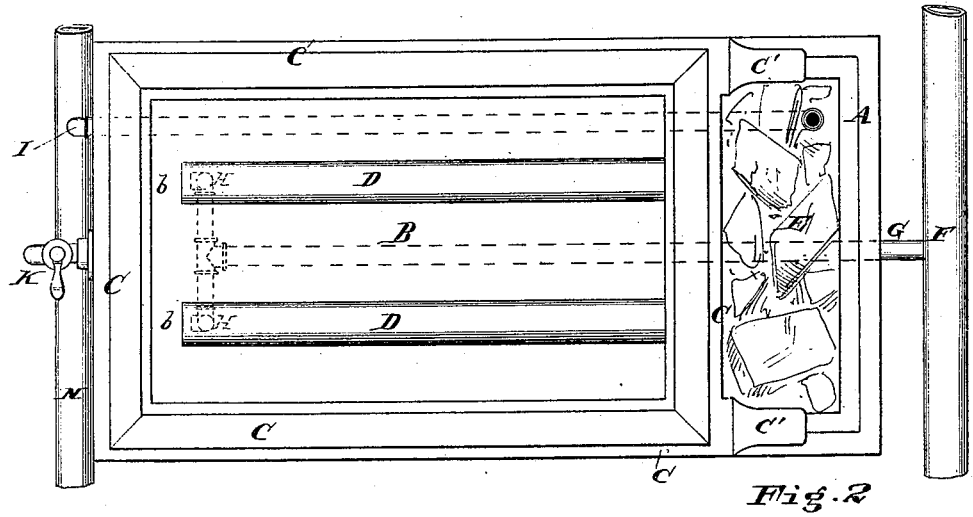
Figure 3:
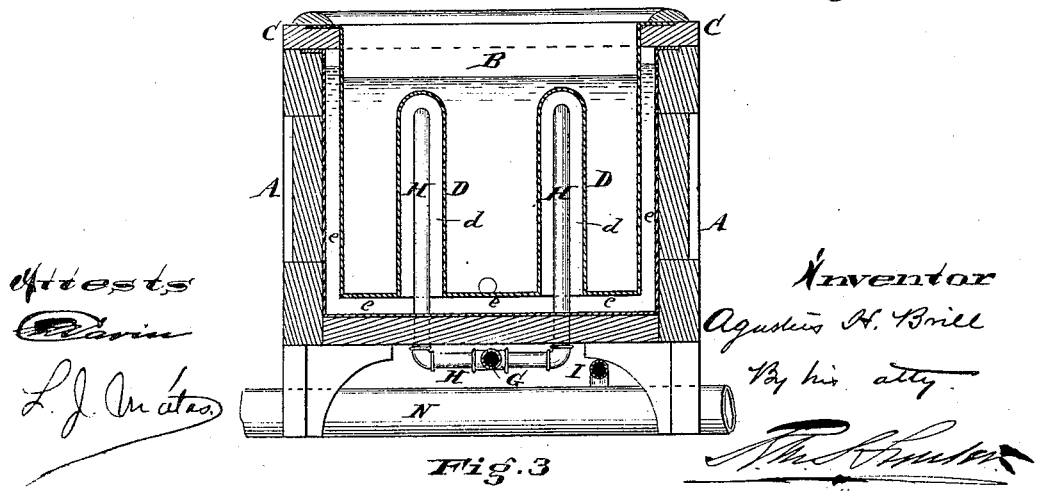

In the drawings, Figure 1 is a sectional elevation of my improved milk-cooler. Fig. 2 is a plan of same. Fig. 3 is a cross-section of same.

A is the water-tank, and may consist of a wooden tank lined with sheet metal.

B is the milk tank or vat, and is made of sheet metal. This vat B is supported from a frame, C, adapted to rest upon the upper edge of the tank A, said frame being preferably provided with handles C'. The vat B is considerably shorter than the tank A, and is so constructed that a space, *e*, of about one-half inch is left between the bottom and sides of the vat B and tank A.

Located in the vat B, and forming part of the same, are ribs D, which extend almost across the tank or vat, said ribs being made hollow, open on the bottom and end *d'*, but closed on the other end, *d*, thus leaving a passage-way for the milk around the end of ribs, as at *b*. The milk and cream are run off by a cock, K, which extends through the tank A to the vat B. The space at E, at one end of the tank A, is the ice-box.

The feed-water from the pump flows from the main F, through pipe G, under the tank A, and then up the vertical pipes H, which are curved over at the top, and discharges itself against the closed ends *d* of the ribs D, and in a somewhat downward direction, thereby causing the water to circulate backward toward the ice-box E after passing through the hollow ribs and under and around the bottom and sides, as indicated by the arrows. After passing through the ice-box the water escapes by the overflow J, which is made up of conical sections of tubing *j j*, and after passing through pipe I it escapes to the pump by main N, and is forced back into the cooler through the main F and feed-pipes H, thus keeping up a constant circulation of cold water from the closed ends of the ribs and through the ice-box. The ice-box being formed in the water-tank and adjacent to the milk-vat, a local cooling effect is obtained by contact, as well as the cooling effect by circulation.

By constructing the overflow J of sections various heights of water in tank A may be used and governed at will.

I do not limit myself to the number of hollow ribs in the vat, as any number may be used, and said vat and tank may be made of any material desired.

Two or more milk-vats may be suspended in one water-tank, said tank acting as a common reservoir to all the vats.

Having now described my invention, what I claim as new, and desire to secure by Letters Patent, is—

1. In a milk-cooler, a vat to contain milk, provided with horizontal ribs open upon one end and bottom and closed on the top and other end, combined with a water-tank in which said milk-vat sits, said water-tank being longer than the milk-vat to form an ice-box on the end, and pipes independent of the ribs, extending up into the same to feed cold water at the closed ends and near the top of the ribs, and through which it passes to the open ends and into the ice-box, said open ends of the ribs opening directly into the ice-box, substantially as and for the purpose specified.

2. In a milk-cooler, a water-tank, A, in combination with a milk-vat, B, secured to a frame and supported in said water-tank, said milk-vat being shorter than the water-tank to form an ice-box, and provided with hollow ribs D, closed at one end and open on the bottom and other end, passage-way b, feed-pipes H, independent of the ribs, extending up into said ribs and close to the closed ends, an ice-box located in said water-tank and at one end of said milk-vat, the open ends of the ribs opening into the ice-box, and an overflow, J, the overflowing water being drawn through the ice-box and passed back to the feed-pipes H through the medium of a pump, substantially as and for the purpose specified.

In testimony of which invention I hereunto set my hand.

AUGUSTUS H. BRILL.

Witnesses:
JAMES W. GLOVER,
W. R. HUNT.